United States Patent [19]
Ishitobi et al.

[11] Patent Number: 5,935,278
[45] Date of Patent: Aug. 10, 1999

[54] ABRASIVE COMPOSITION FOR MAGNETIC RECORDING DISC SUBSTRATE

[75] Inventors: Ken Ishitobi; Takanori Kido, both of Shiojiri; Hiromu Sakamoto, Kashiwa, all of Japan

[73] Assignee: Showa Denko Kabushiki Kaisha, Tokyo, Japan

[21] Appl. No.: 08/890,330

[22] Filed: Jul. 9, 1997

[30] Foreign Application Priority Data

Aug. 30, 1996 [JP] Japan .................................. 8-230774
Mar. 6, 1997 [JP] Japan .................................. 9-051838

[51] Int. Cl.$^6$ .................................................. B24B 1/00
[52] U.S. Cl. ................................. 51/306; 51/309; 106/3; 106/11; 438/693
[58] Field of Search ....................... 51/306, 309; 106/3, 106/11; 438/693

[56] References Cited

U.S. PATENT DOCUMENTS

| | | | |
|---|---|---|---|
| 4,883,502 | 11/1989 | Miyazaki et al. | 51/309 |
| 4,929,257 | 5/1990 | Miyazaki et al. | 51/309 |
| 5,104,421 | 4/1992 | Takizawa et al. | 106/3 |
| 5,733,819 | 3/1998 | Kodama et al. | 106/3 |

*Primary Examiner*—Timothy M. Speer
*Attorney, Agent, or Firm*—Sughrue, Mion, Zinn, Macpeak & Seas, PLLC

[57] ABSTRACT

An abrasive composition for polishing a substrate for a magnetic recording disc is described, which comprises finely divided zirconium oxide particles, an abrasion promoter, an optional water-soluble oxidizing agent, and water. This abrasive composition is used for polishing a substrate for a magnetic recording disc by a process wherein the substrate is polished with a pad while the abrasive composition is supplied between the substrate and the pad, and at least one of the pad and the substrate is rotated. The contents of the finely divided zirconium oxide particles, the abrasion promoter and the optional water-soluble oxidizing agent are 2–20 wt. %, 1–20 wt. % and up to 10 wt. %, respectively, based on the weight of the abrasive composition as used for polishing the substrate.

12 Claims, No Drawings

ABRASIVE COMPOSITION FOR MAGNETIC RECORDING DISC SUBSTRATE

BACKGROUND OF THE INVENTION

1. Field of the Invention

This invention relates to an abrasive composition. More particularly, it relates to an abrasive composition used for polishing a substrate for a magnetic recording medium to give a magnetic recording disc having minimized surface irregularities, above which a magnetic head is capable of floating at a low flying height.

2. Description of the Related Art

Magnetic recording discs, i.e., memory hard discs, are widely used as memory means giving quick access to information as external memories of computers and word processors. The magnetic recording discs are made by a process wherein a substrate composed of an aluminum alloy disc blank with a nickel-phosphorus (NiP) surface coating, formed by electroless plating, is surface-polished, and then, a chromium underlayer, a cobalt alloy magnetic film and a carbon protective film are formed in this turn on the polished NiP surface by a sputter deposition.

If the substrate has irregularities on the polished surface which have a height larger than the flying height of a magnetic read/write head, when the magnetic head floating above the magnetic disc flies at a high speed, the head impinges upon the irregularities with the result of damage of the magnetic head. If the substrate for the magnetic recording disc has polish marks or irregularities, the marks or irregularities develop on the surfaces of the chromium underlayer, the cobalt alloy magnetic film and the carbon protective film in turn, and consequently a functional defect is caused on the magnetic recording disc. Thus it is necessary to polish the substrate surface with a high precision for giving a magnetic recording disc having a smooth surface.

A wide variety of abrasive compositions and polishing methods have heretofore been proposed for removing or minimizing irregularities on the surface of substrate for magnetic recording discs and providing a smooth substrate surface with neither polish marks nor irregularities. As examples of the proposed abrasive compositions or polishing methods, there can be mentioned (1) a two-stage polishing method using an abrasive composition comprising aluminum oxide having incorporated therewith (i) an oxidizing agent such as sodium hypochlorite, or colloidal aluminum, and (ii) cerium dioxide (Japanese Unexamined Patent Publication [hereinafter abbreviated to "JP-A"] 60-108489), (2) an abrasive composition comprising alumina having incorporated therein sulfumic acid or phosphoric acid (JP-A 61-291674), (3) an abrasive composition comprising alumina having incorporated therein aluminum nitrate (JP-A 62-25187), (4) an abrasive composition comprising alumina having incorporated therein boehmite (JP-A 1-188264), (5) an abrasive composition comprising alumina having incorporated therein a metal salt and boehmite (JP-A 1-205973), (6) an abrasive composition comprising alumina having incorporated therein a metal sulfite salt (JP-A 2-158682), (7) an abrasive composition comprising alumina having incorporated therein boehmite and an ammonium salt of an organic or inorganic acid (JP-A 2-158683), (8) a polishing method using an abrasive composition comprising an alumina slurry having pre-treated with an ultrasonic filter (JP-A 3-106984), (9) an abrasive composition comprising alumina having incorporated therein boehmite and a water-soluble peroxide (JP-A 3-115383), (10) an abrasive composition comprising alumina having incorporated therein an amino acid (JP-A 4-108887), (11) an abrasive composition comprising alumina having incorporated therein (i) aluminum sulfate and/or aluminum chloride, and (ii) at least one compound selected from peroxide, nitric acid, a nitrate salt, a nitrite salt and an aromatic nitro compound (JP-A 4-275387), (12) an abrasive composition comprising alumina having incorporated therein a chelate compound, boehmite and an aluminum salt (JP-A 4-363385), (13) an abrasive composition comprising alumina having incorporated therein boehmite which has been obtained by heat-treating rectangular primary particles of gibbsite, and (14) an abrasive composition comprising colloidal silica particles and a chemical etching agent (JP-A 7-240025).

In the above-mentioned proposals (1) through (13), finely divided alumina or other aluminum compounds having an average particle diameter of about 1 µm are used as an abrasive, and thus, the substrate surfaces polished by these abrasive compositions exhibit a smoothness of an extent such that a practically acceptable flying height can be ensured. However, in these years, a lower flying height is eagerly desired for allowing recording density to be increased, and it is difficult or impossible by these proposals to provide a perfect substrate surface with a high precision on which the desired lower flying height can be achieved.

In the above-mentioned proposal (14), colloidal silica particles having an average particle diameter of several-tens nanometer are used as an adhesive, a polished substrate surface with a high precision can be obtained. However, the rate of polishing is low and thus the productivity is low, and, when polishing is conducted for a long time, the circumferential edge part of a substrate surface is undesirably abraded in excess.

When an abrasive with a high hardness is used for polishing, polish marks tend to occur on a substrate surface, and thus, an abrasive with an appropriate hardness should be chosen depending upon the particular hardness of the NiP coating on the substrate. Further, in view of the quality (such as absence of polish marks and reduced number of pits) required for an aluminum magnetic recording disc of the type above which a magnetic head floats at a low flying height, an abrasive having a particle diameter of submicrons and a sharp particle size distribution should be chosen.

In general an α-alumina is used as abrasive for an aluminum magnetic recording disc. However, α-alumina has a very high hardness as compared with that of the NiP coating, and therefore, when α-alumina is used as an abrasive for an aluminum disc of the type floating at a low flying height, the crystalline structure, the particle size distribution and other properties of the α-alumina abrasive should be strictly controlled. Further, finely divided alumina particles have a problem such that, although grinding or pulverizing is employed for the industrial production thereof, the yield of particles of the desired size is low and thus their productivity is low.

In contrast to α-alumina abrasive, a silica abrasive has a low hardness and does not cause polish marks and pits on the substrate surface. However, the rate of polishing is very low and the productivity is low.

SUMMARY OF THE INVENTION

A primary object of the present invention is to provide an abrasive composition used for polishing a substrate for a magnetic recording disc at a high rate to give a magnetic recording disc having a reduced surface roughness, minimized surface irregularities and polish marks, and exhibiting a high recording density.

Another object of the present invention is to provide a process for polishing a substrate for a magnetic recording disc by which the polishing can be effected at a high rate and which results in a polished substrate giving a magnetic recording disc exhibiting a high recording density.

In one aspect of the present invention, there is provided an abrasive composition for polishing a substrate for a magnetic recording disc, comprising finely divided zirconium oxide particles, an abrasion promoter and water.

In another aspect of the present invention, there is provided an improvement in a process for polishing a substrate for a magnetic recording disc wherein the substrate is polished with a pad while an abrasive composition is supplied between the substrate and the pad, and at least one of the pad and the substrate is rotated, the improvement comprising using an abrasive composition comprising finely divided zirconium oxide particles, an abrasion promoter and water.

Preferably, the above-mentioned abrasive composition further contains a water-soluble oxidizing agent. The contents of the respective ingredients in the abrasive composition as used for polishing the substrate are preferably as follows: finely divided zirconium oxide particles 2 to 20% by weight, abrasion promoter 1 to 20% by weight, and water-soluble oxidizing agent not larger than 10% by weight, based on the weight of the abrasive composition.

DESCRIPTION OF THE PREFERRED EMBODIMENTS

The abrasive composition of the present invention is used especially for polishing a substrate to give a magnetic recording disc, by which a high magnetic recording density usually of at least 500 Mbit/inch$^2$ can be attained, and which is represented by a magnetic recording disc for a magnetic recording head utilizing a magnetic resistance (MR) effect. But, the abrasive composition can also be used for polishing other substrates to give magnetic recording media with a high reliability.

The abrasive composition of the present invention contains finely divided particles of zirconium oxide as an abrasive. The zirconium oxide particles are usually in the form of secondary particles, which are agglomerates of primary particles. The zirconium oxide particles are preferably of a size such that the primary particles have an average particle diameter in the range of 0.001 to 0.3 $\mu$m and the secondary particles have an average particle diameter of 0.1 to 1.0 $\mu$m. Further, the zirconium oxide particles preferably have a sharp particle size distribution. The average particle diameter of primary particles can be determined by measuring a particle diameter as an average value of long diameter and short diameter by a scanning electron microscope (SEM) photograph. The average particle diameter of secondary particles can be determined by a laser diffraction particle size analyzer.

The abrading action of zirconium oxide greatly varies depending upon the particular secondary particles thereof. The larger the size of secondary particles, the higher the abrading action. As the size of secondary particles increases, polish marks tend to occur on the polished surface. Similarly, as the size of primary particles increases, polish marks tend to occur. Therefore, to prevent or minimize the occurrence of polish marks, it is preferable that the size of secondary particles falls within a certain range and the size of primary particles is smaller than a certain value.

More specifically, the average particle diameter of secondary particles is preferably not larger than 1.0 $\mu$m to prevent the occurrence of polish marks, and is preferably at least 0.1 $\mu$m to enhance the abrading action. The secondary particles having an average particle diameter of 0.1 to 1.0 $\mu$m correspond to primary particles having an average particle diameter of 0.001 to 0.3 $\mu$m. The smaller the average particle diameter of primary particles within this range, the more preferable the primary particles.

If the particle size distribution of zirconium oxide is broad, polish marks tend to occur. Therefore, the particle size distribution is preferably sharp, and it is especially preferable that the diameter ($D_{90}$) at a cumulative distribution of 90% by weight in the particle size distribution of secondary particles and the diameter ($D_{10}$) at a cumulative distribution of 10% by weight in the particle size distribution of secondary particles satisfy the formula: $D_{90}/D_{10} \leq 3.0$.

The finely divided zirconium oxide particles are made by the following method.

The zirconium oxide particles used are finely divided and thus are preferably produced by a wet process wherein a zirconium compound such as zirconium alkoxide, zirconyl chloride ($ZrOCl_2$) or zirconium nitrate ($Zr(NO_3)_4$) is hydrolyzed. More specifically, an aqueous alkaline solution such as aqueous ammonia is incorporated with the zirconium compound to thereby hydrolyze the zirconium compound, and the pH of the solution is adjusted to a value of 0 to 4 to give a colloidal sol. Then the colloidal sol is neutralized with an alkaline substance such as ammonia to a pH of 7 to 8 whereby the colloidal sol is coagulated. The thus-prepared precipitate is washed with water, and filtered to remove ammonium chloride and hydrochloric acid.

After the filtration, the collected precipitate is dried to give a colloidal zirconium oxide precursor, i.e., a zirconium hydrate or amorphous zirconium oxide. The colloidal zirconium oxide precursor is calcined to give crystalline zirconium oxide. The calcination temperature is preferably in the range of 400 to 1,100° C. If the calcination temperature is lower than 400° C., the zirconium oxide is crystallized only to a limited extent. If the calcination temperature exceeds 1,100° C., the crystal size of finely divided zirconium oxide particles (both of primary particles and secondary particles) becomes undesirably large and the polishing performance is lowered.

Preferably the thus-obtained crystalline zirconium oxide powder is classified or filtered whereby the particle size distribution becomes sharp. Then the zirconium oxide powder is dispersed in water to make an aqueous slurry. The dispersion in water is preferably conducted by a method wherein the zirconium oxide powder and water are incorporated together, for example, in a ball mill to thoroughly pulverize the powder. The thus-prepared aqueous slurry has well-dispersed therein finely divided zirconium oxide particles, and is very stable.

The abrasive composition of the present invention has incorporated therein an abrasion promoter to impart a chemical abrading function to the composition, and enhance the abrading efficiency. As specific examples of the abrasion promoter, there can be mentioned aluminum nitrate (Al($NO_3$)$_3$), aluminum sulfate ($Al_2(SO_4)_3$), aluminum oxalate ($Al_2(C_2O_4)_3$), ferric nitrate ($Fe(NO_3)_3$), aluminum lactate (Al($C_3H_5O_3$)$_3$), gluconic acid ($C_6H_{12}O_7$) and malic acid ($C_4H_6O_5$). Of these, aluminum salts of acids are preferable, and aluminum nitrate is most preferable.

The abrasion promoter exhibits a chemical function such as corrosive action to the substrate, and the abrading efficiency can be greatly enhanced by the combination of a physical abrading action of zirconium oxide particles with the chemical function of the abrasion promoter.

If a water-soluble oxidizing agent is further incorporated in the abrasive composition, the abrading action is more enhanced. As specific examples of the water-soluble oxidizing agent, there can be mentioned hydrogen peroxide ($H_2O_2$), nitric acid, potassium permanganate ($KMnO_4$), perchloric acid ($HClO_4$), sodium perchlorate ($NaClO_4$) and sodium hypochlorite (NaClO).

Auxiliary ingredients can be incorporated in the aqueous abrasive composition comprising the finely divided zirconium oxide particles, the abrasion promoter, water and the optional water-soluble oxidizing agent. The auxiliary ingredients include, for example, a surface active agent, a preservative and a PH adjuster such as an alkali or an acid. For example, when the abrasive composition contains an acid salt of aluminum such as aluminum nitrate as an abrasion promoter, pH of the abrasive composition is preferably adjusted to a value of 2 to 5.

The contents of the above-mentioned ingredients in the aqueous abrasive composition of the present invention as used for polishing a substrate for a magnetic recording disc are as follows. It is convenient that, when the aqueous abrasive composition is as-made and in storage, the contents of the respective ingredients are high (i.e., the abrasive composition is concentrated), and, when it is applied for polishing the substrate, the abrasive composition is diluted to the desired concentration, explained below.

The content of finely divided zirconium oxide particles is preferably 2 to 20% by weight based on the weight of the abrasive composition. If the content of zirconium oxide is lower than 2% by weight, the rate of polishing is lowered and a long time is required for completion of polishing. Even if the content of zirconium oxide is higher than 20% by weight, the rate of polishing is not enhanced and the abrasive composition is not economical.

The content of the abrasion promoter is preferably in the range of 1 to 20% by weight, more preferably 2 to 15% by weight, based on the weight of the abrasive composition. When the content of the abrasion promoter is too low, the rate of polishing is lowered, a long time is required for completion of polishing, and the circumferential edge part of the substrate surface is undesirably abraded in excess. As the content of the abrasion promoter is increased, the rate of polishing increases until the content reaches about 15% by weight, but, when the content exceeds about 15% by weight, it increases only to a negligible extent. Any baneful influence is not exerted on the polished surface when the content exceeds about 15% by weight, but, the upper limit is 20% by weight from an economical viewpoint.

The content of the optional water-soluble oxidizing agent is preferably not larger than 10% by weight based on the weight of the abrasive composition, for enhancement of the abrading action. Even if the content of the oxidizing agent exceeds 10% by weight, the enhancement of abrading action is rather reduced.

The substrate for a magnetic recording disc to be polished with the aqueous abrasive composition of the present invention is not particularly limited. However, the abrasive composition of the present invention is advantageously used for polishing substrates made of a disc blank of aluminum or an aluminum alloy such as an aluminum-magnesium alloy. As preferable examples of the substrates, there can be mentioned aluminum or aluminum alloy disc blanks, which have been plated with nickel-phosphorus (NiP), nickel-copper (NiCu) or cobalt-phosphorus (CoP), or which have been subjected to anodic oxidation.

The polishing of the substrate can be effected by a process wherein the substrate is polished with a pad while the aqueous abrasive composition of the present invention is supplied between the substrate and the pad, and at least one of the pad and the substrate is rotated.

The substrate polished with the abrasive composition of the present invention have extremely minimized surface irregularities. The surface roughness (Ra) is about 3 to 5 angstroms and thus the smoothness is excellent.

The invention will now be described by the following examples wherein % is by weight unless otherwise specified.

Characteristics of polished substrates and magnetic recording discs were evaluated by the following methods.

(1) Rate of abrasion

After completion of polishing, a polished substrate was washed with water, dried and then the weight reduction due to polishing was measured. The reduction of thickness ($\mu$m) of the substrate was calculated from the weight reduction, and the rate of abrasion was expressed by the reduction of substrate thickness ($\mu$m) per minute.

(2) Surface roughness (Ra) of substrate

The surface roughness (Ra) of a polished substrate was measured by a Talystep and a Talydata 2000 (supplied by Rank Taylor Hobson Co.).

(3) Polish marks and pits on substrate

The presence of polish marks on a polished substrate was observed by the naked eye under irradiation with a halogen lamp in a dark room.

The surface defect on the polished substrate was observed by a differential interference contrast microscope with 50X magnification, and the results were expressed by the number of pits per substrate surface.

(4) Missing-pulse errors

A magnetic recording disc was tested by a glide certifier tester RQ-3000, supplied by Hitachi DECO Co., under the following testing conditions.

Track width: 3 $\mu$m

Recording density: flux variation 70,000 per inch

Flying height of head: 2.0 micro-inch (50.8 nm)

Number of revolution: 4,500 rpm

Slice level: 65%

Missing-pulses smaller than a slice level of 65%, i.e., missing-pulses wherein the ratio of the output waveform to the input waveform was smaller than 65%, were rated as missing-pulse errors. The evaluation results were expressed by the number of missing-pulse errors per disc.

(5) Flying height ($\mu$m) of magnetic head

By using the above-mentioned glide certifier tester, a head was allowed to float above the magnetic disc, and, while the flying height of the magnetic head was gradually reduced, the lowest permissible flying height was measured at which the head commenced to impinge on irregularities on the disc surface.

EXAMPLES 1–16 AND COMPARATIVE EXAMPLES 1, 2

Preparation of Abrasives

Finely divided zirconium oxide particle abrasives used in Examples 1–16 were prepared as follows.

In a two-liter beaker, 250 g of zirconium oxychloride ($ZrOCl_2 \cdot 8H_2O$), 260 ml of pure water and 320 ml of 2.8 N aqueous ammonia were mixed together, and the obtained solution was put in a one-liter glass autoclave. The solution was heated at 130° C. under a high pressure for 7 hours while being stirred. Then the reaction solution was cooled to room temperature and taken from the autoclave. The entire amount of the thus-collected milk-white colloidal sol could pass through a filter paper.

The colloidal sol was neutralized with aqueous ammonia to a pH value of 7 to 8 whereby the colloidal sol was coagulated to give a precipitate which was capable of being washed with water and filtered. The precipitate was washed with water and filtered, and this operation of washing and filtration was repeated three times to remove by-product ammonium chloride and hydrochloric acid.

The thus-collected precipitate was dried at 150° C. for 3 hours to give 104 g of a powdery colloidal zirconium oxide precursor. The precursor had a specific surface area of 176.8 m$^2$/g. 90 g of the precursor was calcined at 500° C. for 30 minutes in an alumina crucible to give a zirconium oxide powder. The X-ray diffractometry revealed that the crystalline phase of the zirconium oxide powder was a monoclinic baddeleyite. The zirconium oxide powder had a specific surface area of 65.8 m$^2$/g. Primary particles of the zirconium oxide powder were proved to have an average particle diameter of 0.05 μm by SEM measurement, and secondary particles thereof were proved to have an average particle diameter of 0.37 μm by a laser granulometry. In the particle diameter distribution of secondary particles of zirconium oxide, the ratio ($D_{90}/D_{10}$) of the diameter ($D_{90}$) at a cumulative distribution of 90% by weight to the diameter ($D_{10}$) at a cumulative distribution of 10% by weight was about 2.8. The particle size distribution was measured by a granulometer SALD-2000 supplied by Shimadzu Corp.

In a 0.7 liter nylon pot mill, 80 g of the calcined zirconium oxide powder was incorporated together with 187 ml of pure water and zirconium oxide balls having a diameter of 5 mm. The zirconium oxide powder was milled and dispersed in water at a pot revolution of 80 rpm for 96 hours. The aqueous zirconium oxide slurry, collected from the pot mill, had a pH of 4.9 because of a minor amount of residual hydrogen chloride. The aqueous slurry was very stable. Namely, when the aqueous slurry was settled over a period of one week, only a negligible amount of precipitate was formed. The size of the zirconium oxide particles was not changed to any appreciable extent by the milling in a pot mill, and thus, the sizes of secondary particles and primary particles of zirconium oxide in the aqueous slurry were the same as those as measured before the milling.

For comparison, finely divided α-alumina particles having an average particle diameter of 0.8 μm and colloidal silica having an average particle diameter of 0.06 μm (NS-2, supplied by Nissan Chem. Co.) were used as abrasives, respectively, in Comparative Examples 1 and 2.

Aqueous adhesive compositions were prepared by incorporating aluminum nitrate, aluminum sulfate, aluminum oxalate, ferric nitrate, aluminum lactate, gluconic acid or malic acid as an abrasion promoter with the abrasive according to the formulation shown in Table 1.

TABLE 1

| Example | Abrasive | | Abrasion promoter | | Auxiliary | |
|---|---|---|---|---|---|---|
| | Kind | Amount (wt. %) | Kind | Amount (wt. %) | Kind | Amount (wt. %) |
| Ex. 1 | Zirconium oxide | 1 | Aluminum nitrate | 2.0 | — | |
| Ex. 2 | Zirconium oxide | 5 | Aluminum nitrate | 5.0 | — | |
| Ex. 3 | Zirconium oxide | 10 | Aluminum nitrate | 5.0 | — | |
| Ex. 4 | Zirconium oxide | 20 | Aluminum nitrate | 5.0 | — | |
| Ex. 5 | Zirconium oxide | 5 | Aluminum nitrate | 0.5 | — | |
| Ex. 6 | Zirconium oxide | 5 | Aluminum nitrate | 1.0 | — | |
| Ex. 7 | Zirconium oxide | 5 | Aluminum nitrate | 2.0 | — | |
| Ex. 8 | Zirconium oxide | 5 | Aluminum nitrate | 10.0 | — | |
| Ex. 9 | Zirconium oxide | 5 | Aluminum nitrate | 2.0 | $H_2O_2$ | 1 |
| Ex. 10 | Zirconium oxide | 5 | Aluminum nitrate | 2.0 | Nitric acid | 0.2 |
| Ex. 11 | Zirconium oxide | 5 | Aluminum sulfate | 2.0 | — | |
| Ex. 12 | Zirconium oxide | 5 | Aluminum oxalate | 2.0 | — | |
| Ex. 13 | Zirconium oxide | 5 | Ferric nitrate | 2.0 | — | |
| Ex. 14 | Zirconium oxide | 5 | Aluminum lactate | 2.0 | — | |
| Ex. 15 | Zirconium oxide | 5 | Gluconic acid | 1.0 | — | |
| Ex. 16 | Zirconium oxide | 5 | Malic acid | 1.0 | — | |
| C.E. 1 | Alumina | 7 | Aluminum nitrate | 2.0 | — | |
| C.E. 2 | Colloidal silica | 10 | Aluminum nitrate | 2.0 | — | |

C.E. Comparative Example

Polishing Test

An aluminum alloy disc blank with a nickel-phosphorus (NiP) plating having a diameter of 3.5 inches (95 mm) and a thickness of 0.8 mm was used as a substrate for a magnetic recording disc.

The substrate was polished under the following conditions.

Polishing machine: 4-way double-sided polishing machine (SFDL-98-PP, supplied by Speedfam Co.) with a surface plate having a diameter of 640 mm.

Polishing pad: Suede-type (Polytex DG, supplied by Rodel, Inc.)

Number of revolution of lower surface plate: 60 rpm

Feed rate of crude aqueous abrasive composition: 50 ml/min

Working pressure: 50 g/cm$^2$

By using a direct current sputtering apparatus, a chromium layer with a thickness of 100 nm was formed on the polished substrate, and then a $Co_{86}Cr_{12}Ta_2$ magnetic layer having a thickness of 25 nm was formed thereon. A protecting carbon layer was formed on the magnetic layer, and finally, a lubricating coating composed of a perfluoropolyether lubricating agent having a thickness of 2 nm was formed on the carbon layer to give a magnetic recording disc.

The evaluation results of polishing rate of the substrate, surface roughness of the polished substrate, and presence of polish marks and number of pits on the polished substrate, number of missing-pulse errors on the magnetic recording disc, and flying height of a magnetic head are shown in Table 2.

TABLE 2

| | Polishing rate (μm/min) | Surface roughness Ra (angstrom) | Polish marks | Surface flaw (pits/disc) | Flying height of head (μm) | Missing-pulse errors (/disc) |
|---|---|---|---|---|---|---|
| Ex. 1 | 0.19 | 4 | No | 0 | 0.017 | 0 |
| Ex. 2 | 0.33 | 3 | No | 0 | 0.016 | 0 |
| Ex. 3 | 0.36 | 5 | No | 0 | 0.017 | 0 |
| Ex. 4 | 0.38 | 4 | No | 0 | 0.017 | 0 |
| Ex. 5 | 0.21 | 5 | No | 3 | 0.017 | 0 |
| Ex. 6 | 0.24 | 3 | No | 0 | 0.017 | 0 |
| Ex. 7 | 0.30 | 4 | No | 0 | 0.016 | 0 |
| Ex. 8 | 0.34 | 3 | No | 0 | 0.016 | 0 |
| Ex. 9 | 0.35 | 4 | No | 0 | 0.017 | 0 |
| Ex. 10 | 0.31 | 4 | No | 0 | 0.016 | 0 |
| Ex. 11 | 0.16 | 5 | No | 0 | 0.016 | 0 |
| Ex. 12 | 0.20 | 4 | No | 0 | 0.017 | 0 |
| Ex. 13 | 0.24 | 5 | No | 0 | 0.017 | 0 |
| Ex. 14 | 0.16 | 5 | No | 0 | 0.016 | 0 |
| Ex. 15 | 0.20 | 4 | No | 0 | 0.016 | 0 |
| Ex. 16 | 0.19 | 4 | No | 0 | 0.016 | 0 |
| C.E. 1 | 0.60 | 15 | Found | 40 | 0.022 | >60 |
| C.E. 2 | 0.12 | 2 | No | 0 | 0.015 | 0 |

Note,
C.E. Comparative Example

As seen from Table 1 and Table 2, when alumina is used as an abrasive (Comparative Example 1), the rate of polishing is high, but the polished substrate surface has large surface roughness, polish marks and many bits, and the magnetic recording disc exhibits high flying height of magnetic head and many missing-pulse errors. When colloidal silica is used as an abrasive (Comparative Example 2), the rate of polishing is low although other characteristics are satisfactory.

In contrast, when the abrasive composition containing zirconium oxide of the present invention is used (Examples 1–16), the rate of polishing is high, occurrence of polish marks and bits on the polished surface is not found or found only to a negligible extent, and there is no occurrence of missing-pulse error on the magnetic recording disc. Further the flying height of head above the magnetic recording disc is low, namely, irregularities on the disc are minimized. Therefore, the magnetic recording disc made by using the abrasive composition of the present invention is suitable for magnetic recording at a high recording density employing an MR head.

What is claimed is:

1. An abrasive composition for polishing a substrate for a magnetic recording disc, which comprises, based on the weight of the abrasive composition used for polishing the substrate, 2 to 20% by weight of finely divided zirconium oxide particles, 1 to 20% by weight of an abrasion promoter and water.

2. The abrasive composition according to claim 1 wherein the finely divided zirconium oxide particles have a size such that primary particles thereof have an average particle diameter in the range of 0.001 to 0.3 μm and secondary particles thereof have an average particle diameter of 0.1 to 1.0 μm.

3. The abrasive composition according to claim 1 wherein the finely divided zirconium oxide particles have a particle size distribution such that the diameter ($D_{90}$) at a cumulative distribution of 90% by weight in particle size distribution of secondary particles thereof and the diameter ($D_{10}$) at a cumulative distribution of 10% by weight in particle size distribution of secondary particles thereof satisfy the requirement that the ratio of $D_{20}/D_{10}$ is 3.0 or less.

4. The abrasive composition according to claim 1 wherein the abrasion promoter is an aluminum salt of an acid.

5. The abrasive composition according to claim 4 wherein the aluminum salt is aluminum nitrate.

6. The abrasive composition according to claim 1 which further comprises not more than 10% by weight or less, based on the weight of the abrasive composition used for polishing the substrate, of a water-soluble oxidizing agent.

7. The abrasive composition according to claim 6 wherein the water-soluble oxidizing agent is selected from the group consisting of hydrogen peroxide, nitric acid, potassium permanganate, perchloric acid, sodium perchlorate and sodium hypochlorite.

8. An improvement in a process for polishing a substrate for a magnetic recording disc wherein the substrate is polished with a pad while an abrasive composition is supplied between the substrate and the pad, and at least one of the pad and the substrate is rotated, the process comprising using an abrasive composition comprising, based on the weight of the abrasive composition used for polishing the substrate, 2 to 20% by weight of finely divided zirconium oxide particles, 1 to 20% by weight of an abrasion promoter and water.

9. The process according to claim 8 wherein the finely divided zirconium oxide particles have a size such that primary particles thereof have an average particle diameter in the rage of 0.001 to 0.3 μm and secondary particles thereof have an average particle diameter of 0.1 to 1.0 μm.

10. The process according to claim 8 wherein the abrasion promoter is an aluminum salt of an acid.

11. The process according to claim 8 wherein the abrasive composition further comprises not more than 10% by weight, based on the weight of the abrasive composition as used for polishing the substrate, of a water-soluble oxidizing agent.

12. The process according to claim 8 wherein the substrate for a magnetic recording disc is a disc blank made of aluminum or an aluminum alloy, which has been plated with nickel-phosphorus, nickel-copper or cobalt-phosphorus, or which has been subjected to anodic oxidation.

* * * * *

UNITED STATES PATENT AND TRADEMARK OFFICE
CERTIFICATE OF CORRECTION

PATENT NO. : 5,935,278
DATED : August 10, 1999
INVENTOR(S) : Ken Ishitobi, Takanori Kido and Hiromu Sakamoto It is certified that error appears in the above-identified patent and that said Letters Patent is hereby corrected as shown below:

Claim 3, last line, delete "$D_{20}/D_{10}$" and insert therefor --$D_{90}/D_{10}$--.

Column 10, line 42, change "rage" to --range--.

Signed and Sealed this

Twenty-ninth Day of August, 2000

Attest:

Q. TODD DICKINSON

Attesting Officer

Director of Patents and Trademarks